Aug. 14, 1923.

1,464,503

C. LE G. FORTESCUE

FREQUENCY CHANGER

Filed Sept. 19, 1919

WITNESSES:
J. A. Helsel
D. C. Davis.

INVENTOR
Charles LeG. Fortescue
BY
Wesley G. Carr
ATTORNEY

Patented Aug. 14, 1923.

1,464,503

UNITED STATES PATENT OFFICE.

CHARLES LE G. FORTESCUE, OF PITTSBURGH, PENNSYLVANIA, ASSIGNOR TO WESTINGHOUSE ELECTRIC & MANUFACTURING COMPANY, A CORPORATION OF PENNSYLVANIA.

FREQUENCY CHANGER.

Application filed September 19, 1919. Serial No. 324,825.

*To all whom it may concern:*

Be it known that I, CHARLES LE G. FORTESCUE, a subject of the King of Great Britain, and a resident of Pittsburgh, in the county of Allegheny and State of Pennsylvania, have invented a new and useful Improvement in Frequency Changers, of which the following is a specification.

My invention relates to frequency-changers of the commutator type, such, for example, as shown in U. S. Patent 682,943, issued to the Westinghouse Electric & Manufacturing Company on Sept. 17, 1901, on an application filed by B. G. Lamme, and it has for its object to provide apparatus of the character designated that shall commutate in a more effective manner.

Figure 1:
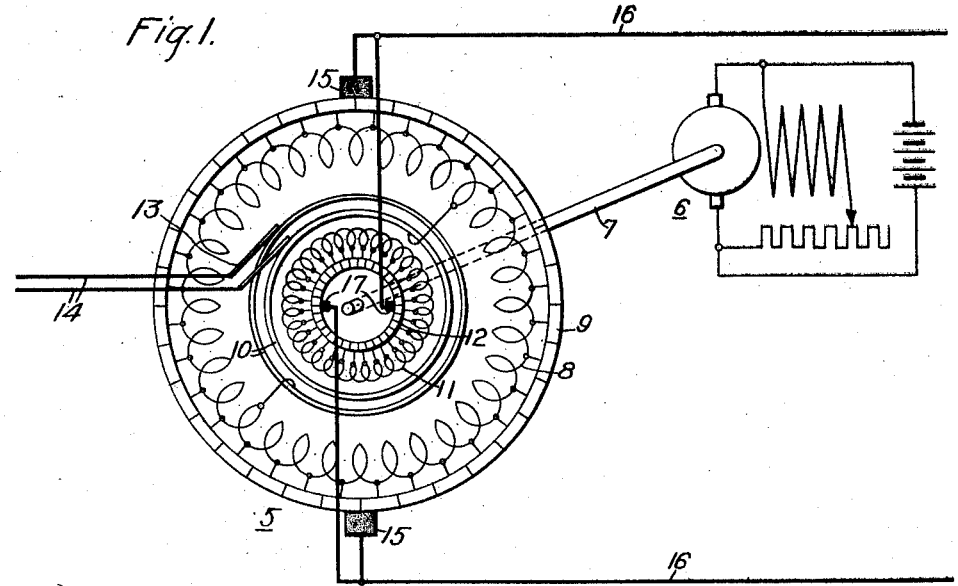
Figure 2:
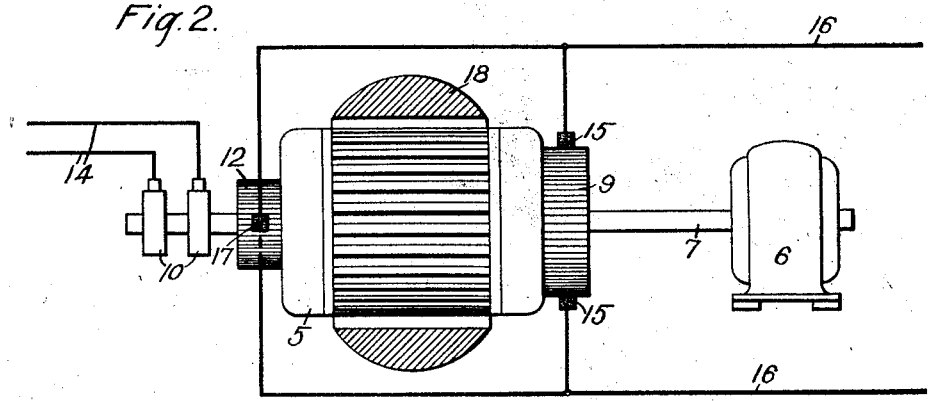

In the accompanying drawing, Fig. 1 is a circuit diagram of a machine embodying a preferred form of my invention, and Fig. 2 is a side view, partially in section and partially in elevation, of the machine of Fig. 1.

Frequency-changers are well-known wherein an armature is provided with a commutator and with slip rings and wherein one circuit is connected to the brushes of the commutator and the other to the slip rings. By driving this armature at various speeds and by supplying current of given frequency, as to the slip rings, currents of various frequencies may be taken from the brushes of the commutator. Apparatus of this character, however, has been subject to the disadvantage that the commutation was rather poor.

I find that by placing an auxiliary distributed winding on the armature, with a commutator associated therewith, and by supplying current from the output mains to this auxiliary commutator through brushes in electrical quadrature to the main brushes, a field may be developed in the armature which will radically improve the commutation.

Referring to the drawing for a more detailed understanding of my invention, I show an armature at 5 driven from an auxiliary variable-speed motor 6 through a shaft 7. The armature 5 is provided with a main winding 8 connected, on the one hand, to the segments of a commutator 9 and, on the other hand, to slip rings 10. The armature 5 is further provided with an auxiliary distributed winding 11 connected to the segments of a commutator 12.

Suitable brushes 13 bear on the slip rings 10 and are connected to supply mains 14 energized by single-phase current of the supply frequency.

Main brushes 15—15 bear on the commutator 9 and are connected to the load circuit 16—16 to which it is desired to supply the generated frequency.

The armature 5 is driven, at any desired speed, by the shaft 7 from the motor 6 so that current is produced in the mains 16—16 of different frequency from that which is supplied through the mains 14 but with a tendency to defective commutation at the brushes 15—15.

In order to overcome this difficulty, the auxiliary brushes 17—17 bear on the auxiliary commutator 12 in electrical quadrature to the brushes 15—15 and are connected, respectively, to these main brushes, so that alternating current of the generated frequency flows through the distributed winding 11 and produces alternating flow therein in quadrature to the brushes 15—15. The cutting of this field by the short-circuited armature coils undergoing commutation produces such electromotive force therein as to radically improve the commutation and, furthermore, this improvement is suitable in nature, under varying conditions of load and with varying output frequencies, since the frequency of the current producing the alternating-current field is the output frequency of the machine.

Referring to Fig. 2, one structural arrangement of the apparatus of Fig. 1 is shown, the main commutator 9 being mounted at one end of the armature 5 and the auxiliary commutator 12 being placed at the other end thereof, within the slip rings 10—10.

In order to complete the magnetic circuit of the armature, a field member 18 is disposed therearound. If the armature 5 is not self-driving, the field member 18 need have no winding and may actually rotate with the armature, as is well known with machines of this type.

While I have shown my invention in its preferred form, it will be obvious to those skilled in the art that it is not so limited but is susceptible of various minor changes and modifications without departing from the spirit thereof and I desire, therefore, that only such limitations shall be placed thereupon as are imposed by the prior art or are specifically set forth in the appended claims.

I claim as my invention:

1. The combination with a frequency-changer of the commutator type, of armature means including brushes in electrical quadrature with the main brushes for producing such commutating field therein as to substantially neutralize the electromotive force in the short-circuited armature coils undergoing commutation.

2. The combination with a frequency-changer of the commutator type, of armature means for producing a commutating field to be cut by the short-circuited armature coils undergoing commutation, said means being energized by current of the frequency flowing through the main commutator of the machine.

3. In a frequency-changer of the commutator type, the combination with an armature provided with a main winding and with a main commutator and slip rings associated therewith for the supply and removal of current to and from the armature winding, respectively, of an auxiliary distributed winding on said armature, and means for supplying said distributed winding with alternating current of the frequency flowing through the main commutator in such manner that a commutating field is produced in said auxiliary winding, and operative upon the short-circuited armature coils of said main winding undergoing commutation.

4. In a frequency-changer of the commutator type, the combination with an armature provided with a main winding and with a main commutator and slip rings associated therewith for the supply and removal of current to and from the armature winding, respectively, of an auxiliary distributed winding on said armature, an auxiliary commutator associated therewith, brushes on said commutator in electrical quadrature to the main brushes of the machine, and means for supplying current to said auxiliary brushes of the frequency of the current flowing through the main commutator of the machine.

5. In a frequency-changer of the commutator type, the combination with an armature provided with a main winding and with a main commutator and slip rings associated therewith for the supply and removal of current to and from the armature winding, respectively, of an auxiliary distributed winding on said armature, an auxiliary commutator associated therewith, brushes on said commutator in electrical quadrature to the main brushes of the machine, and connections from the main brushes of said machine to said auxiliary brushes, whereby said auxiliary winding is energized with current at the frequency of the currents flowing through the main commutator of said machine, and a commutating field is produced therein of such phase and magnitude as to radically improve the commutation of said machine.

6. The method of improving commutation in a frequency-changer of the commutator type which comprises generating an alternating commutating field therein in electrical quadrature to the main brushes and of the frequency of the currents flowing through the main brushes.

7. The method of improving commutation in a frequency-changer of the commutator type provided with an auxiliary distributed armature winding which comprises supplying currents of the frequency of the currents in the main commutator of said machine to points in said auxiliary winding in electrical quadrature to the main brushes of the machine.

8. The combination with a supply system embodying current of one frequency, of a load system demanding current of different frequency from that of said supply system, and a frequency-changer therebetween comprising an armature provided with a main commutator and slip rings associated respectively with a main armature winding, one of said current-transmitting means being connected to said supply circuit and the other to said load circuit, means for completing a magnetic circuit for magnetomotive forces produced in said armature by said main winding, an auxiliary armature winding on said armature, an auxiliary commutator associated therewith, brushes bearing on said auxiliary commutator in electrical quadrature to the main brushes of the machine, leads connecting said auxiliary brushes with said main brushes respectively, whereby said auxiliary armature winding is energized with currents at the frequency of the currents flowing through the main commutator and a commutating field is produced therein of such frequency, phase and magnitude as to compensate for the sparking electromotive forces in the short-circuited main armature coils undergoing commutation, and means for driving said armature at any desired speed.

9. The method of operating a system embodying a supply circuit of one frequency, a load circuit of another frequency and a driven armature connected therebetween and provided with main and auxiliary distributed windings, with main commutator and slip rings conductively associated with said main winding and with an auxiliary commutator conductively associated with said auxiliary armature winding which comprises supplying currents to said auxiliary winding at points in quadrature to the main commutator brushes and of the frequency of the currents flowing through the main commutator brushes, whereby a commutating field is produced in said auxiliary armature winding of such frequency, phase and magnitude as to compensate for the sparking electromotive forces in the short-circuited armature coils undergoing commutation.

10. The combination with a frequency changer having an armature member and a commutator-type armature winding on said armature member, of main brushes bearing on the commutator member of said armature winding for connection with an alternating-current system of one frequency, and means excited from said main brushes and including auxiliary commutator brushes associated with said armature member and displaced approximately 90 electrical degrees from said main brushes for producing a commutating field.

11. The combination with a double-current machine of the type having an armature member provided with slip-rings, a main commutator member and a pair of main brushes bearing on said main commutator member, of auxiliary means for producing a commutating field and including an armature winding separate from the winding associated with said main commutator member, an auxiliary commutator member associated with said separate winding, and auxiliary brushes bearing on said auxiliary commutator member.

In testimony whereof, I have hereunto subscribed my name this 30th day of Aug. 1919.

CHARLES LE G. FORTESCUE.